United States Patent

[11] 3,563,557

| [72] | Inventor | Kingsley A. Doutt<br>Alpena, Mich. |
|---|---|---|
| [21] | Appl. No. | 772,975 |
| [22] | Filed | Nov. 4, 1968 |
| [45] | Patented | Feb. 16, 1971 |
| [73] | Assignee | Scovill Manufacturing Company<br>Waterbury, Conn. |

[54] DUAL PISTON SEAL
1 Claim, 2 Drawing Figs.

[52] U.S. Cl. .................................................. 227/178;
277/206; 277/209; 92/243
[51] Int. Cl. ...................................................... F16j 9/04;
F16j 15/32
[50] Field of Search .......................................... 277/178,
63, 206, 209; 92/243

[56] References Cited
UNITED STATES PATENTS

| 2,470,925 | 5/1949 | Fredrickson | 277/206 |
| 2,770,510 | 11/1956 | Collins | 277/178X |
| 2,772,931 | 12/1956 | Biedermann | 277/178X |
| 2,984,529 | 5/1961 | Dailey | 277/178 |
| 2,994,571 | 8/1961 | Peras | 277/178 |
| 3,347,556 | 10/1967 | Fleckenstein et al. | 277/206 |

*Primary Examiner*—Samuel D. Rothberg
*Attorney*—Webster B. Harpman

ABSTRACT: A piston seal for a piston and cylinder assembly and comprising an annular sealing member or ring having oppositely disposed sidewardly extending flanges for sealing engagement with said cylinder and an intermediate transversely flat annular bearing surface. The piston seal having secondary oppositely disposed flanges adjacent its point of contact with the piston and the outer annular edges of said flanges being rounded in a modified O-ring configuration. The innermost transverse surface of the annular seal having an annular groove registry with an annular rib on a piston on which the piston seal is positioned.

PATENTED FEB 16 1971

3,563,557

INVENTOR.
KINGSLEY A. DOUTT
BY
W. B. Harpman
ATTORNEY

DUAL PISTON SEAL

BACKGROUND OF THE INVENTION

1. Field of the Invention

This invention relates to piston seals and more particularly to the sealing of reciprocal pistons in piston and cylinder assemblies.

2. Description of the Prior Art

The prior art seals have been many and varied in configuration and utility. One of the more popular types of seals is the so-called U cup in which the annular seal is of cross-sectionally U-shaped configuration with one portion of the U-shape forming a wiping surface against the cylinder wall, such as in Pat. No. 2,897,785. Others include relatively large outwardly extending flanged members which both engage and supposedly seal against the cylindrical wall, see for example, Pat. No. 2,719,510.

Other prior art structures attempt to form the dual opposed sealing flanges with some form of bearing between, see for example, Pat. No. 3,319,537 wherein an annular ring of rigid plastic material separates the sealing portions of the piston seal and forms a bearing surface. Still other variations are found in Pats. 2,709,118 and 2,739,856.

This invention eliminates the problems occasioned by introducing a separate bearing structure into a double flanged piston seal ring by forming the device integrally and at the same time arranging and shaping the lower flanges, those closest to the axis of the piston, so that they engage the piston in an O-ring-like sealing action.

SUMMARY OF THE INVENTION

The piston seal ring disclosed herein consists of an annular integral member formed of resilient material and incorporating a central body portion of rectangular cross section having an annular groove inwardly of its smallest diameter. The opposite sides of the seal are provided with two pairs of flanges, the innermost flanges having their outer annular edges rounded in the manner of an O-ring and the innermost surfaces of the flanges are each arcuately shaped so that distortion of the seal under pressure in its environmental operation will cause the O-ring resembling configuration of the edges of the flanges to effectively seal against the appropriate portions of the piston on which it is mounted.

The second pair of flanges are angularly disposed with respect to the main body of the piston seal and extend so as to place portions thereof in sealing, wiping relation on the cylinder in which the device is located. While the intermediate area provides a transversely flat annular bearing surface of relatively small clearance and which floats the piston relative to the cylinder in which it is reciprocally mounted.

DESCRIPTION OF THE PREFERRED EMBODIMENT

Figure 1:
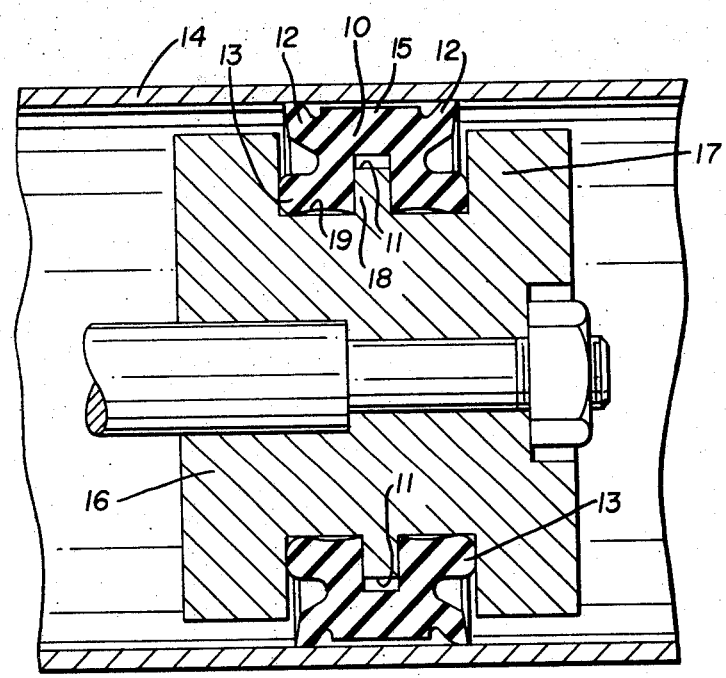
FIG. 1 is a cross-sectional elevation of a piston and cylinder assembly showing the dual piston seal in position therein.

In the form illustrated and described herein, the invention consists of an annular resilient piston sealing ring member formed as a generally rectangular body 10 having an annular groove 11 in the inner annular surface thereof. Each side of the annular member 10 is provided with a pair of tapered spaced concentric sidewardly extending flanges 12 and 13.

The flanges 12 are angularly disposed relative to the horizontal and vertical center lines of the piston seal 10 and their uppermost surfaces are slightly longer than their lower surfaces so that when the upper surfaces of the flanges 12 are engaged against the innersurface of a cylinder 14 they will flatten somewhat and form an effective sealing relation therewith.

An intermediate transversely flat annular bearing surface 15 is provided between the oppositely disposed angularly positioned flanges 12 just referred to. The bearing surface 15 is so formed that there is slight clearance between the same and the inner surface of the cylinder 14 which permits the presence of a lubricating film facilitating the reciprocal movement of the piston which thereby floats on the bearing surface 15 of the double piston seal.

By referring to FIG. 1 of the drawings the double piston seal ring may be seen in its environmental use mounted on a piston 16 in an annular groove 17 thereof which annular groove 17 has a centrally disposed annular rib 18. The groove 11 heretofore described in the dual piston seal registers with the rib 18 and forms a sealing means.

As seen in FIG. 1 of the drawings, the fluid pressures in the cylinder 14 have repositioned the flanges 12 and 13 of the dual piston seal ring to their operative position and wherein the upper surfaces of the oppositely disposed angularly inclined flanges 12 are arranged in sealing engagement with the inner wall of the cylinder 14 while the outer edges of the annular flanges 13 which are rounded in an O-ring resembling configuration have been moved into tight sealing relation with the groove 17 in the piston. As this occurs, the slight arcuate configuration in the as formed shape of the innermost surfaces of the flanges 13 has flattened out as the dual piston seal ring distorts and assumes its sealing position.

Figure 2:
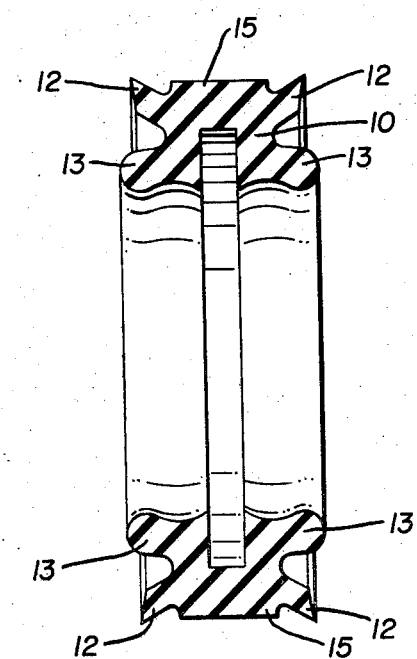
FIG. 2 is a cross section through the piston seal seen in FIG. 1 showing the same in as formed configuration.

By referring now to FIG. 2 of the drawings, it will be seen that in its as formed shape these arcuate surfaces are indicated by the numeral 19. Also in FIG. 2 of the drawings it will be seen that the as formed configuration of the dual piston seal provides for the angular shaping of the flanges 12 on both their upper and lower sides which as hereinbefore described tends to flatten out when in engagement with the inner surface of the cylinder 14 and subjected to the operating pressures therein.

It will thus be seen that the dual piston seal ring described herein will by reason of its novel configuration assume a close fitting sealing relation with the piston 16 and the cylinder 14 in which it is reciprocally positioned.

Those skilled in the art will observe that as illustrated in FIG. 1 of the drawings, the piston 16 is mounted on a piston rod 17 and will realize that the usual piston heads, glands, inlet and outlet ports etc. of a piston and cylinder assembly are necessary in a complete piston and cylinder assembly.

From the foregoing it will be seen that when the dual piston seal ring is in its environmental position and fluid pressures are present in the cylinder and in moving relation to the piston, the configuration of the dual piston seal changes. The changes which occur from the as formed configuration of the dual piston seal to the inner surface configuration result in the dual piston seals ability to effectively provide nonleaking easily movable sealing relation between the piston 16 and cylinder 14.

Although but one embodiment of the present invention has been illustrated and described, it will be apparent to those skilled in the art that various changes and modifications may be made therein without departing from the spirit of the invention or the scope of the appended claims.

I claim:

1. A dual resilient integral piston seal ring for a piston and cylinder assembly wherein,
   a. said piston having a ring seal receiving channel with bottom and sidewalls extending thereabout and a narrow rib extending radially outwardly substantially medially of said sidewalls from the bottom of the channel and terminating substantially medially of the height of said sidewalls;
   b. said seal ring having a body of generally rectangular formation in cross section and a top, bottom and sidewalls and an annular groove in its bottom wall and concentric outermost and innermost flanges;
   c. the outermost flange being adjacent the top of the body and with outwardly tapered similar extensions at both sides of the body, with each extension tapering to a rather thin edge portion for sealing engagement with an adjacent cylinder wall when the ring is in the piston channel;

d. the innermost flange being concentric with and spaced inwardly from the outermost flange and of greater axial width than the outermost flange and adjacent the bottom of the body and extends outwardly on each side thereof opposite the annular groove in the bottom portion of the body;

e. each extension of the innermost flange having a rounded marginal edge portion thereof for engagement with adjacent opposite sidewalls of the channel and adjacent spaced portions of the bottom wall of the channel in the piston;

f. the narrow rib in the channel fitting into the annular groove in the bottom wall of the body, and g. an intermediate wide cylindrical plane surface on the body between the extensions on either side of the body and the plane surface being slightly below the end tapered marginal edges of each of said outermost flange extensions thus providing a slight space between said plane surface and the adjacent inner surface of the cylinder wall to allow for a lubricating oil film in said space.